(12) United States Patent
Carter et al.

(10) Patent No.: US 11,002,587 B2
(45) Date of Patent: May 11, 2021

(54) ULTRASONIC LEVEL SENSOR WITH SOUND TRAP

(71) Applicant: FLOWLINE, INC., Los Alamitos, CA (US)

(72) Inventors: Larry Elvert Carter, Greeley, CO (US); Michael Richard Ehlert, Irvine, CA (US); Michael Joseph Rafferty, Aliso Viejo, CA (US)

(73) Assignee: FLOWLINE, INC., Los Alamitos, CA (US)

(*) Notice: Subject to any disclaimer, the term of this patent is extended or adjusted under 35 U.S.C. 154(b) by 44 days.

(21) Appl. No.: 16/517,462

(22) Filed: Jul. 19, 2019

(65) Prior Publication Data
US 2019/0368915 A1 Dec. 5, 2019

Related U.S. Application Data

(63) Continuation-in-part of application No. 15/433,796, filed on Feb. 15, 2017, now Pat. No. 10,408,663.
(Continued)

(51) Int. Cl.
*G01F 23/296* (2006.01)
*G01F 25/00* (2006.01)

(52) U.S. Cl.
CPC ...... *G01F 23/2968* (2013.01); *G01F 23/2962* (2013.01); *G01F 23/296* (2013.01); *G01F 25/0061* (2013.01)

(58) Field of Classification Search
CPC ... C30B 15/10; C30B 35/002; G01F 23/2962; G01F 23/2968; G01F 25/0061;
(Continued)

(56) References Cited

U.S. PATENT DOCUMENTS

| 4,146,869 A | 3/1979 | Snyder |
| 4,984,449 A | 1/1991 | Caldwell et al. |

(Continued)

FOREIGN PATENT DOCUMENTS

| CN | 203298800 U | 11/2013 |
| WO | WO 2006/134358 A1 | 12/2006 |

(Continued)

OTHER PUBLICATIONS

Partial International Search Report and Provisional Written Opinion for related Patent Application No. PCT/US2017/020675, dated Jun. 23, 2017, 11 pp., International Searching Authority European Patent Office.

(Continued)

*Primary Examiner* — Nimeshkumar D Patel
*Assistant Examiner* — Gedeon M Kidanu
(74) *Attorney, Agent, or Firm* — Lewis Roca Rothgerber Christie LLP

(57) ABSTRACT

An ultrasonic level sensor includes: a housing; an ultrasonic transducer having a face surface for emitting an ultrasonic signal; a reflector with a flat surface positioned at an angle with respect to the face surface of the ultrasonic transducer for reflecting and directing the ultrasonic signal to a surface of a material in a container; and a scattering structure to reflect unwanted scattered ultrasonic signals away from the surface of the liquid, wherein the ultrasonic signal is reflected from the surface of the material and from the flat surface of the reflector and received by the ultrasonic transducer.

17 Claims, 15 Drawing Sheets

Related U.S. Application Data

(60) Provisional application No. 62/320,072, filed on Apr. 8, 2016.

(58) Field of Classification Search
CPC ...... G01S 15/10; G01S 15/88; G01S 7/52004; G01S 7/521; Y10T 117/10
See application file for complete search history.

(56) References Cited

U.S. PATENT DOCUMENTS

| | | | |
|---|---|---|---|
| 5,121,340 A | | 6/1992 | Campbell et al. |
| 5,301,549 A | | 4/1994 | Sinclair |
| 7,098,669 B2 | | 8/2006 | Carter |
| 7,140,239 B2 | | 11/2006 | Greenwood et al. |
| 8,091,579 B2 | | 1/2012 | Sintes et al. |
| 8,096,177 B2 | | 1/2012 | Burris |
| 8,495,913 B2 | | 7/2013 | Partington et al. |
| 8,919,193 B2 | | 12/2014 | Knowles |
| 8,919,194 B2 | | 12/2014 | Kline |
| 8,928,234 B2 * | 1/2015 | Kim | F21V 33/00 315/193 |
| 9,267,647 B2 * | 2/2016 | Tix | F17D 3/00 |
| 2005/0201205 A1 * | 9/2005 | Chavez | G10K 11/02 367/152 |
| 2007/0261487 A1 * | 11/2007 | Sintes | G01F 23/2962 73/290 V |
| 2014/0113277 A1 | 4/2014 | Thomas | |
| 2015/0177045 A1 | 6/2015 | Cobianu et al. | |
| 2016/0041024 A1 * | 2/2016 | Reimer | G01F 23/2962 73/290 V |

FOREIGN PATENT DOCUMENTS

| | | |
|---|---|---|
| WO | WO 2008/154975 A1 | 12/2008 |
| WO | WO 2015/014810 A1 | 2/2015 |
| WO | WO 2015/197792 A1 | 12/2015 |
| WO | WO 2016/008832 A1 | 1/2016 |

OTHER PUBLICATIONS

Chinese Office Action dated Mar. 4, 2020 regarding Chinese Patent Application No. 2017/80030643.2 corresponding to U.S. Appl. No. 16/517,462 (8 pages).

* cited by examiner

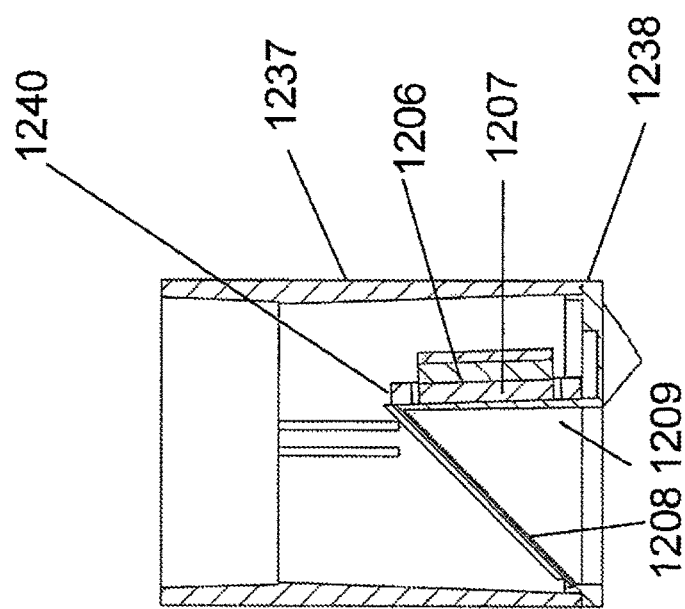
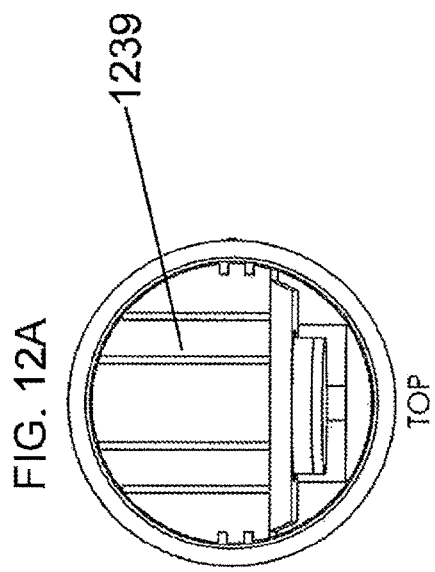
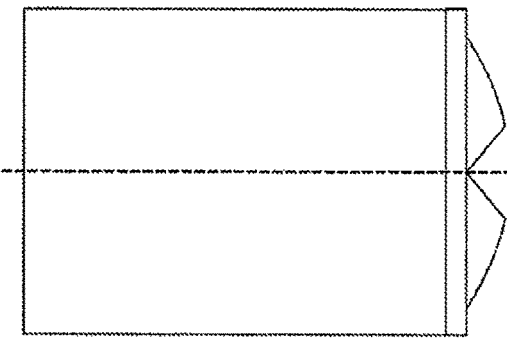

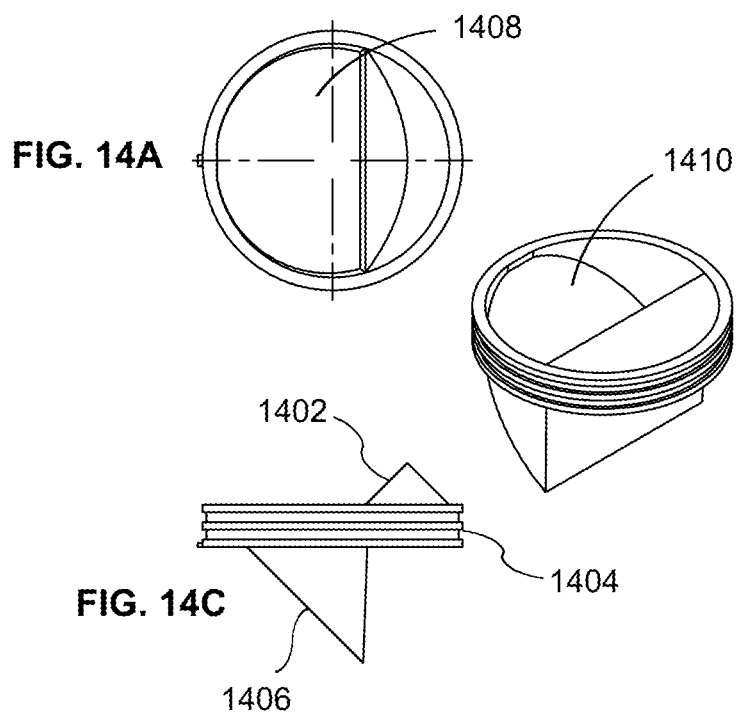
FIG. 14A
FIG. 14B
FIG. 14C
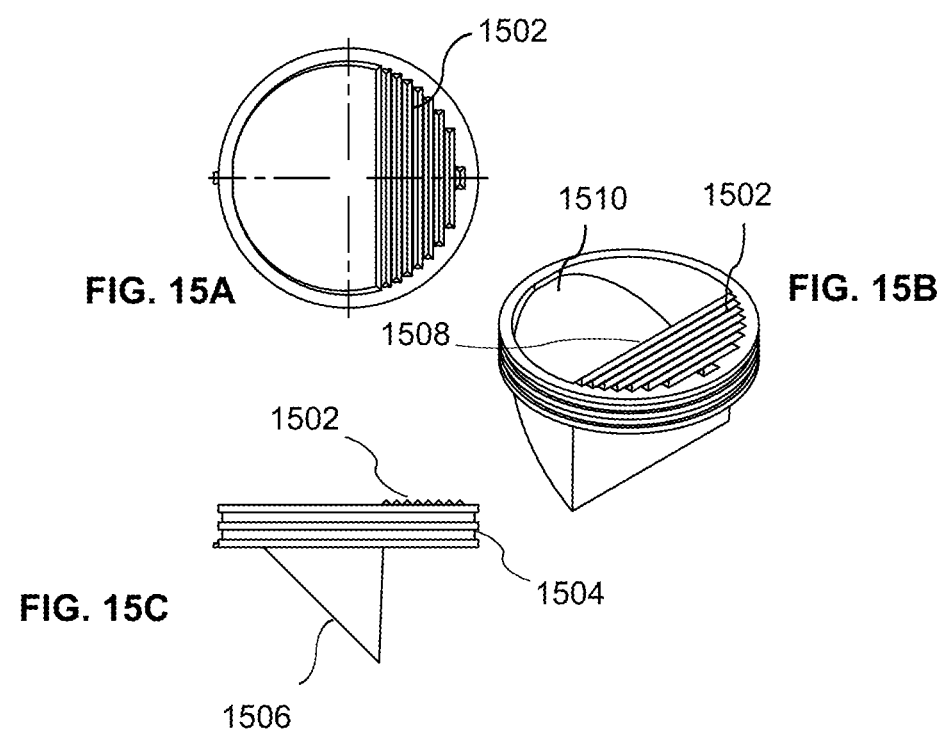
FIG. 15A
FIG. 15B
FIG. 15C

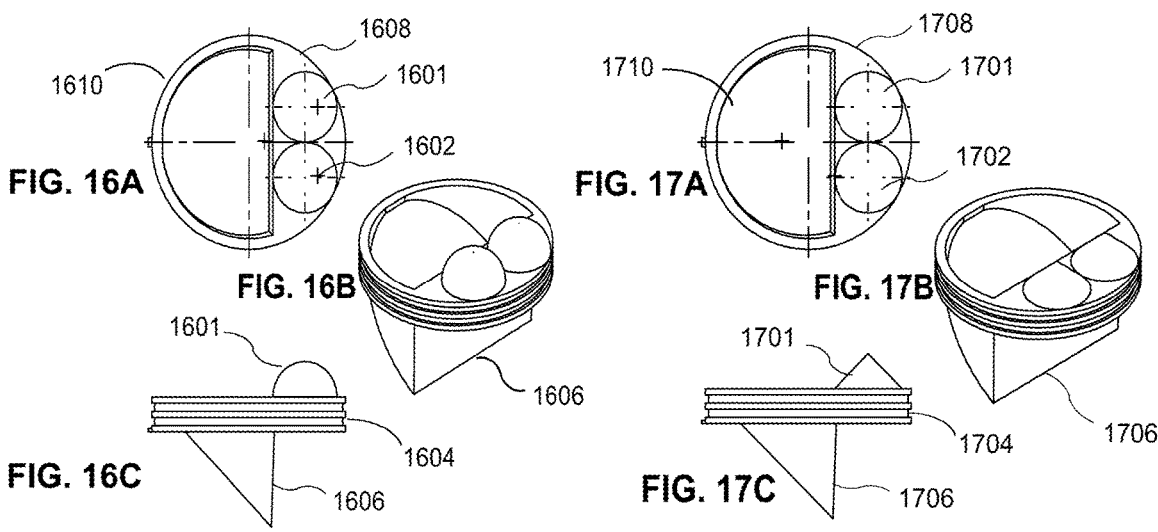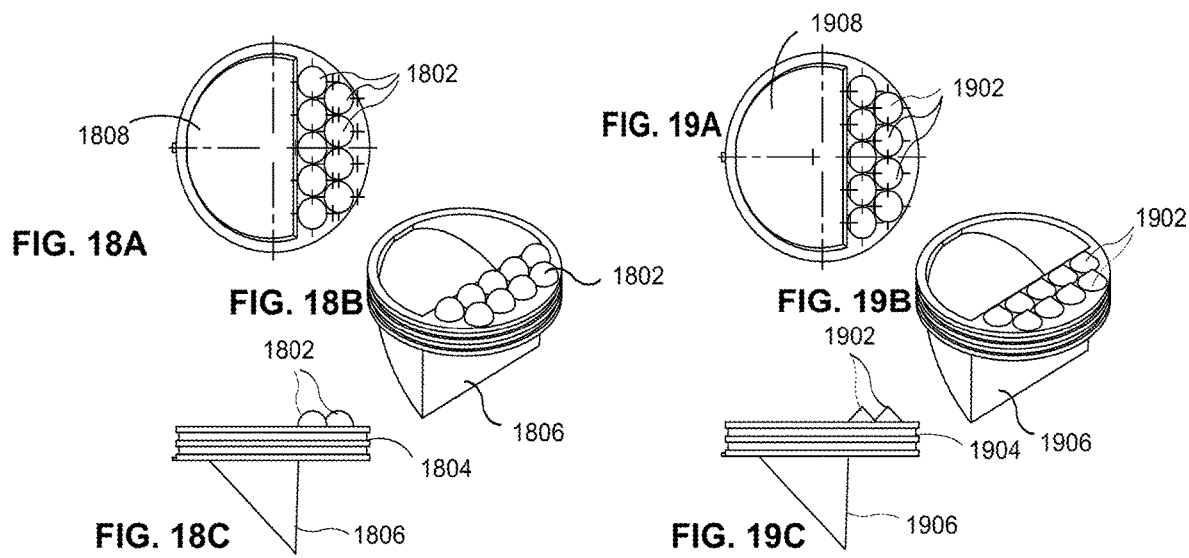

ULTRASONIC LEVEL SENSOR WITH SOUND TRAP

CROSS-REFERENCE TO RELATED APPLICATIONS

This patent application is a continuation-in-part of U.S. patent application Ser. No. 15/433,796, filed Feb. 15, 2017, which claims priority to and the benefit of U.S. Provisional Patent Application Ser. No. 62/320,072, filed on Apr. 8, 2016 and entitled "Ultrasonic Level Sensor With Reflectors," the entire contents of which are hereby expressly incorporated herein by reference.

FIELD OF THE INVENTION

The present invention relates generally to level detectors and more specifically to an ultrasonic level sensor with a sound trap.

BACKGROUND

Ultrasonic level sensors monitor and detect liquid levels in containers by using ultrasonic signals. Such ultrasonic level sensors measure the time that it takes for the ultrasonic signal to travel from the transducer to a liquid surface and back to the sensor and then determine the level of the fluid based on the known speed of sound and time. That is, the ultrasonic waves are reflected from the surface of the liquid and the time for the reflected (echo) ultrasonic waves detected back at the transducer is determined. Since the speed of the ultrasonic wave is known, the measured travel time of the wave provides a measure of the distance to the surface of the liquid. Knowing the geometry (e.g., height of the tank and the position the sensor is mounted), an indication of liquid level can then be determined by a controller (e.g., a processor or computer) coupled to or within the transducer. Typical ultrasonic transducers, such as piezoelectric transducers, generate sound waves, at frequencies greater than about 20 kHz which is above the threshold for human hearing.

Some conventional transducers include several mirrors, however, these mirrored transducers suffer from two main factors. First, the mirror is not flat which distorts the length of travel of the ultrasonic signal and second, the structure creates an undesirable surface where the ultrasonic signal is reflected and therefore causing false echoes

SUMMARY

In some embodiments, the present invention is an ultrasonic level sensor that includes: a housing; an ultrasonic transducer having a face surface for emitting an ultrasonic signal; a reflector with a flat surface positioned at an angle with respect to the face surface of the ultrasonic transducer for reflecting and directing the ultrasonic signal to a surface of a material in a container, wherein the ultrasonic signal is reflected from the surface of the material and from the flat surface of the reflector and received by the ultrasonic transducer; one or more scattering structures to reflect unwanted scattered ultrasonic signals away from the surface of the material, wherein the one or more scattering structure have a wedge-shaped scatter surface or a cone/dome-shaped scatter surface: and a controller for measuring a time period between emission of the ultrasonic signal and receipt of the reflected ultrasonic signal by the transducer to determine an indication of the level of the material in the container.

In some embodiments, the present invention is an ultrasonic level sensor that includes: a housing including mounting means for placement in a container containing a liquid, wherein the container includes a plurality of walls; an ultrasonic transducer having a face surface for emitting an ultrasonic signal, wherein the face surface is at a vertical angle with respect to a surface of the liquid in the container; a flat mirror positioned at an angle with respect to the face surface of the ultrasonic transducer for reflecting and directing the ultrasonic signal to the surface of the liquid, wherein the ultrasonic signal is reflected from the surface of the liquid and from the flat surface of the mirror and received by the ultrasonic transducer; and a plurality of sound traps within the housing to isolate the ultrasonic signal emitted by the ultrasonic transducer from the walls of the container.

In various embodiments, the ultrasonic level sensor may further include one or more of a scattering structure to reflect unwanted ultrasonic signals away from the surface of the material, a sound tube with an opening to allow the reflected ultrasonic signal to be emitted to the surface of the liquid, a seal for the sound tube to prevent the liquid from reaching the transducer face, a mounting means for attaching the ultrasonic level sensor to the container, a wired or wireless transmitter for transmitting the indication of the level of the material in the container, a dampening material placed on the transducer face to dampen any vibrations in the transducer face, another dampening material placed on a back side of the ultrasonic transducer to reduce a ring time created by a resonance frequency of the ultrasonic transducer, and/or a plurality of ribs placed on a back surface of the reflector to stiffen the reflector and prevent vibration of the reflector flat surface.

In some embodiments, including the above-mentioned various embodiments, the transducer face, the flat reflector, and the sound tube may be rotatable with respect to the surface of the material.

In some embodiments, the present invention is a method for calibrating an ultrasonic transducer. The method includes: a) providing a test reflector in front of the transducer; b) selecting a frequency at an edge of a frequency tuning region of the transducer; c) transmitting a pulse with the selected frequency from the transducer towards the test reflector; d) receiving an echo signal of the transmitted pulse reflected from the test reflector; e) determining an amplitude of the echo signal; f) storing the amplitude and the echo signal in a memory; g) incrementally varying the selected frequency and repeating steps c to f, until an entire frequency tuning region is covered; h) selecting a stored echo signal with largest amplitude; and i) determining the frequency of the transmitted pulse used to produce the selected stored echo signal with the largest amplitude and utilizing the determined frequency as the operating frequency of the ultrasonic transducer.

BRIEF DESCRIPTION OF THE DRAWINGS

These and other features, aspects, and advantages of the present invention will become better understood with regard to the following description, appended claims, and accompanying drawings.

FIG. 12A is a top view, FIG. 12B is a front view and FIG. 12C is a sectional view of a mounting method for an ultrasonic transducer where the transducer housing is welded to a tubular housing, according to some embodiments of the disclosed invention.

FIG. 14A shows a bottom view, FIG. 14B shows an isometric view and FIG. 14C shows a side view of a transducer housing including a scattering device having a wedge-shaped scatter surface, according to some embodiments of the disclosed invention.

FIG. 15A shows a bottom view, FIG. 15B shows an isometric view and FIG. 15C shows a side view of a transducer housing including a scattering device having a wedge-shaped scatter surface, according to some embodiments of the disclosed invention.

FIG. 16A shows a bottom view, FIG. 16B shows an isometric view and FIG. 16C shows a side view of a transducer housing including a scattering device having a cone/dome-shaped scatter surface, according to some embodiments of the disclosed invention.

FIG. 17A shows a bottom view, FIG. 17B shows an isometric view and FIG. 17C shows a side view of a transducer housing including a scattering device having a cone/dome-shaped scatter surface, according to some embodiments of the disclosed invention.

FIG. 18A shows a bottom view, FIG. 18B shows an isometric view and FIG. 18C shows a side view of a transducer housing including a scattering device having multiple dome-shaped scatter surfaces, according to some embodiments of the disclosed invention.

FIG. 19A shows a bottom view, FIG. 19B shows an isometric view and FIG. 19C shows a side view of a transducer housing including a scattering device having multiple cone-shaped scatter surfaces, according to some embodiments of the disclosed invention.

DETAILED DESCRIPTION

Figure 1:
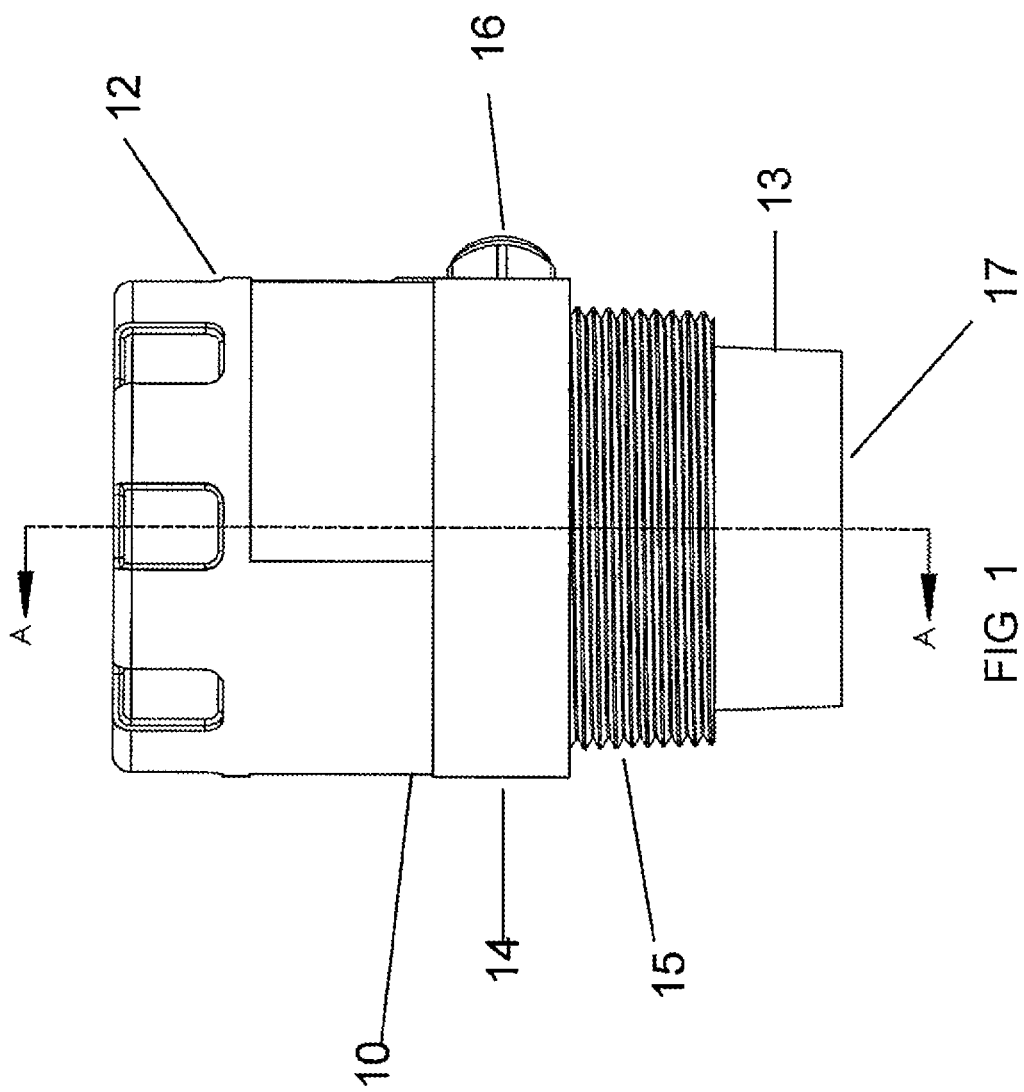
FIG. 1 shows an exemplary simplified ultrasonic level sensor, according to some embodiments of the disclosed invention.

In some embodiments, the disclosed sensor is an ultrasonic level sensor that includes one or more flat reflectors, such as mirrors, that deflect the ultrasonic signal for measuring the level of a material, for example, a liquid or solid materials such as grain and pellets in a container having a plurality of walls.

In some embodiments, the transducer face is placed vertically with respect to the surface of the liquid and thus large droplets of liquid cannot form on the face, because the droplets will run off the face due to gravity. In some embodiments, a flat reflector is place at an angle (for example, at about 45 degrees) with respect to the face of the transducer to provide a path for the ultrasonic signal that is of equal distance across the receiving transducer face. In some embodiments, the disclosed invention includes a structure that eliminates the potential for a flat face to be formed that would reflect the ultrasonic signal back to the transducer face and thus eliminate potential false echo signals that make it difficult to determine the material/liquid level when the level approaches the transducer.

In some embodiments, the disclosed invention includes an optional sealed sound tube that prevents the liquid from reaching the transducer face and thus improving the ability to detect the correct liquid level when the liquid level is at or above the transducer face. In conventional ultrasonic level sensor, the sensor cannot detect an echo return when the liquid touches the transducer face.

In some embodiments, the ultrasonic level sensor includes an ultrasonic transducer for emitting an ultrasonic signal to the surface of the material/liquid and for detecting a return signal, reflected from the surface. A controller instructs the transducer to emit ultrasonic signals and receives an indication that a return signal has been detected. In some embodiments, the data is sampled with an analog to digital converter coupled to the transducer and a filter that includes a finite impulse response filter that is configured to receive the digital input signal and to generate a digital output signal. The liquid level is then determined from the output of the filter, as disclosed in the U.S. Pat. No. 7,098,669, entitled "Depth Determining System," the entire contents of which is herein expressly incorporated by reference.

In some embodiments, the controller includes a timer for measuring the time period between emission of the ultrasonic signal and receipt of a return signal and provides an indication of the material/liquid level. A (radio or wired) transmitter receives an indication of the liquid level and transmits a material/liquid level signal to an input/output device (e.g., 925 in FIG. 9) for displaying or further transmitting (wired or wirelessly) the material/liquid level signal. One or more flat reflectors reflect both the transmitted and the echo ultrasound waves and at the same time, prevent different parts of the reflected signal from traveling different paths.

FIG. 1 shows an exemplary simplified ultrasonic level sensor, according to some embodiments of the disclosed invention. As shown, the level sensor 10 includes a housing 14, a cover 12 with a conduit opening 16 for electrical connections. The housing 14 includes mounting means 15 (for example, threads, flange or any other known mounters/fasteners) to attach to the liquid holding tank, and a sound tube 13, with an opening 17 for ultrasonic signals to be emitted towards a liquid in a container. A controller (shown in FIG. 9) measures a time period between emission of the ultrasonic signal and receipt of the reflected ultrasonic signal by the transducer to determine an indication of the level of the material in the container.

Figure 2:
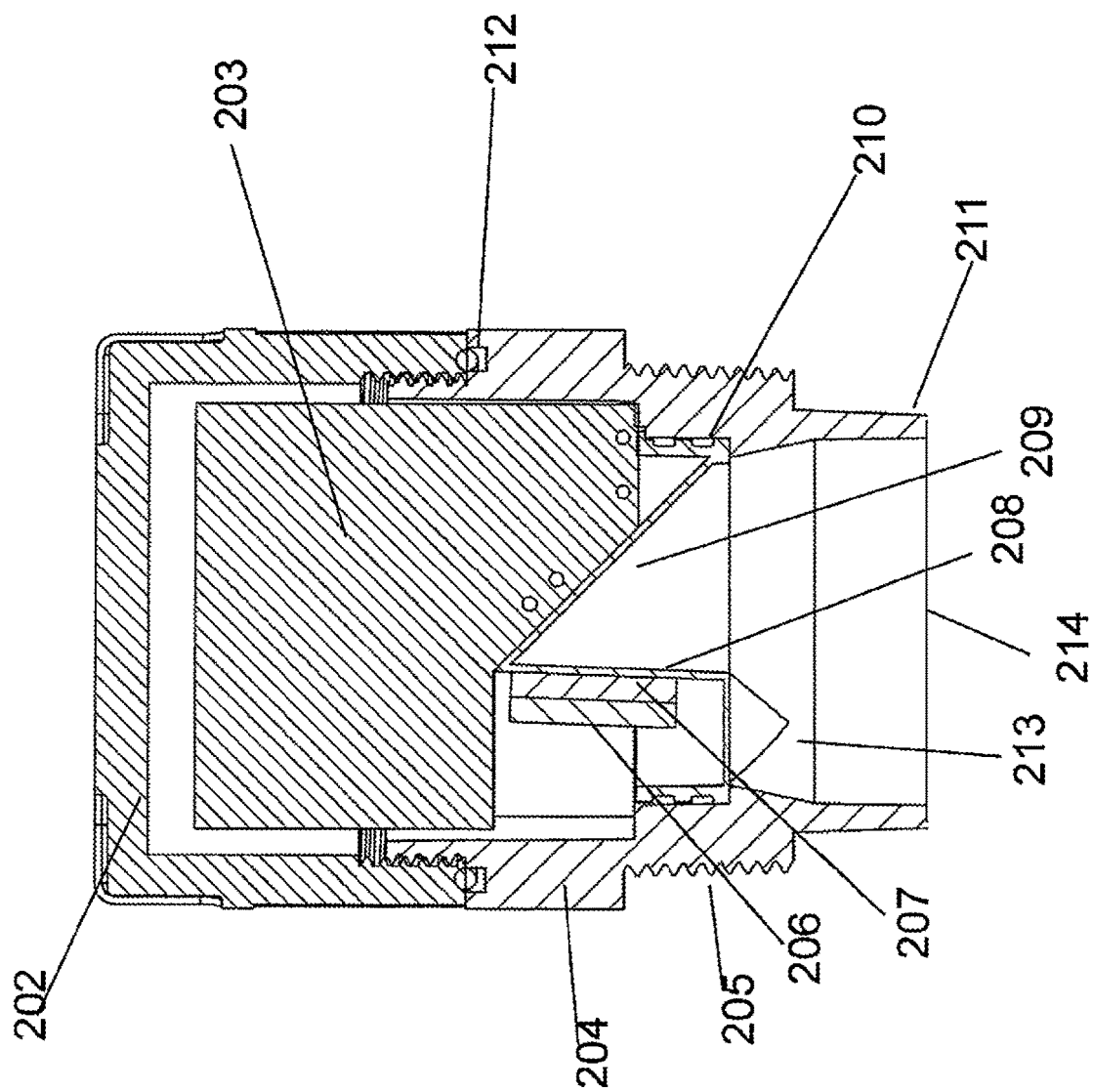
FIG. 2 depicts a cut away view of the ultrasonic level sensor of FIG. 1, according to some embodiments of the disclosed invention.

FIG. 2 depicts a cut away view of the ultrasonic level sensor of FIG. 1, according to some embodiments of the disclosed invention. As depicted, the ultrasonic level sensor includes a printed circuit board 203 that holds the circuitry to produce the ultrasonic signal, to receive the echo and to process an output, a cover 202 to protect the enclosed electronics, a housing 204 to provide a mounting mechanism to the liquid holding tank and to provide a mount for the ultrasonic transducer structure, an electrical-to-acoustic and acoustic-to-electrical device 206, such as a piezoelectric cell, to convert the electric signals to sound and back again, a matching block 207 to provide an acoustic transformer to match the acoustic impedances of the piezoelectric cell to the impedance of air, and a transducer housing. In these particular embodiments, the transducer housing is a plastic part that makes up items 210, 208 and 209. This molded part forms the continuous part that the piezo cell is mounted on and forms the mirror, as shown.

The transducer housing may include the transducer face 208 to provide protection to the piezoelectric cell and matching block from liquids and vapors in the storage tank, a flat reflector 209 (such as a mirror, a metallic surface and the like) for reflecting both the transmitted and the echo ultrasound waves from the transducer to the surface of the liquid, a pyramid shaped, or other shape, scattering surface 213 and mounting means 210, such as a mounting wall, to provide a surface for attaching the transducer assembly to the housing. The ultrasonic level sensor may further include O-rings and structure 212 to prevent intrusion into the sensor at the point the cover meets the housing, and openings 214 for the ultrasonic sound to leave and enter the sensor.

In some embodiments, the transducer face 208, the flat reflector 209, scattering structure 213 and mounting wall 210 are all integrally formed of the same piece of material, for example, plastic to provide a complete seal against any corrosive liquids or fumes in the environment/container. In some embodiments, the transducer face is vertical (with respect to fluid surface) to promote the best removal of condensation. In some embodiments, the flat reflector 209 is angled at 45 degrees to reflect the ultrasonic signal straight down to the surface such that reflections from the liquid surface (which is horizontal) propagate directly straight up and back to the transducer face.

The flat reflector configuration of the disclosed invention also has the advantage of having a smaller size than the conventional devices and having the capability of easily being mounted into a standard threaded process mount using threads 205. A sound tube 211 prevents splashing liquids from reaching the transducer face 208 and prevents the liquid from reaching the transducer face 208 in the case of the overfilling the container. That is, since the transducer housing and the sound tube are air tight, when liquid rises up above the opening of these structures, air is trapped in the cavity that is formed by the structure. The air trapped in the cavity thus protects the face of the transducer from getting contaminated by the liquid. This ensures that there is an air gap between the transducer face 208 and the liquid surface at all times. The ultrasonic level sensor can then detect the liquid surface and report a valid level output, via an I/O device using a chosen communication protocol, wired or wireless.

Figure 11:
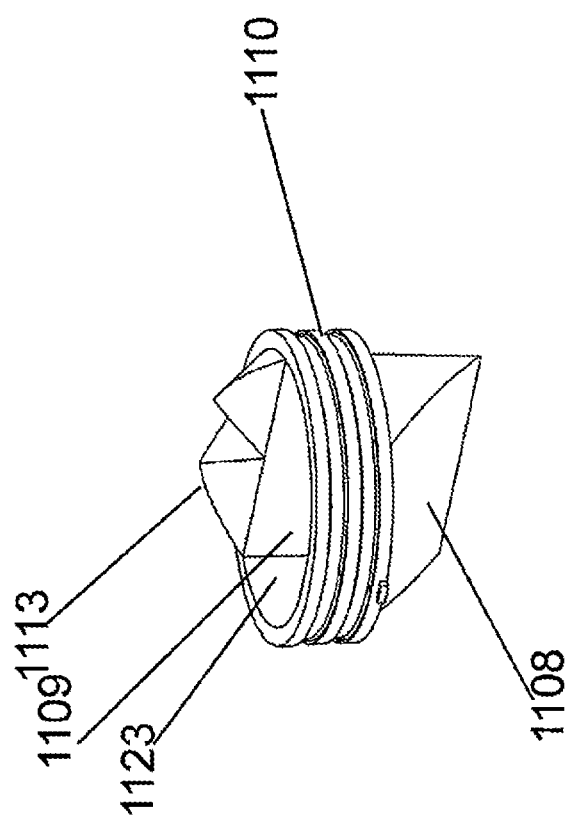
FIG. 11 shows an isometric view of a transducer housing, according to some embodiments of the disclosed invention.

FIG. 11 shows an isometric view of a transducer housing, according to some embodiments of the disclosed invention. As shown, scattering device 1113 having a scatter surface, such as a pyramid-shaped structure (reflectors) scatters the ultrasonic sound signals. The transducer face 1109, flat reflector 1108 (the back side of which is shown), and an opening 1123 for the ultrasonic sound to travel are also shown. Transducer mounting surface and groves 1110 for O-rings help seal attachment points to the housing.

Figure 3:
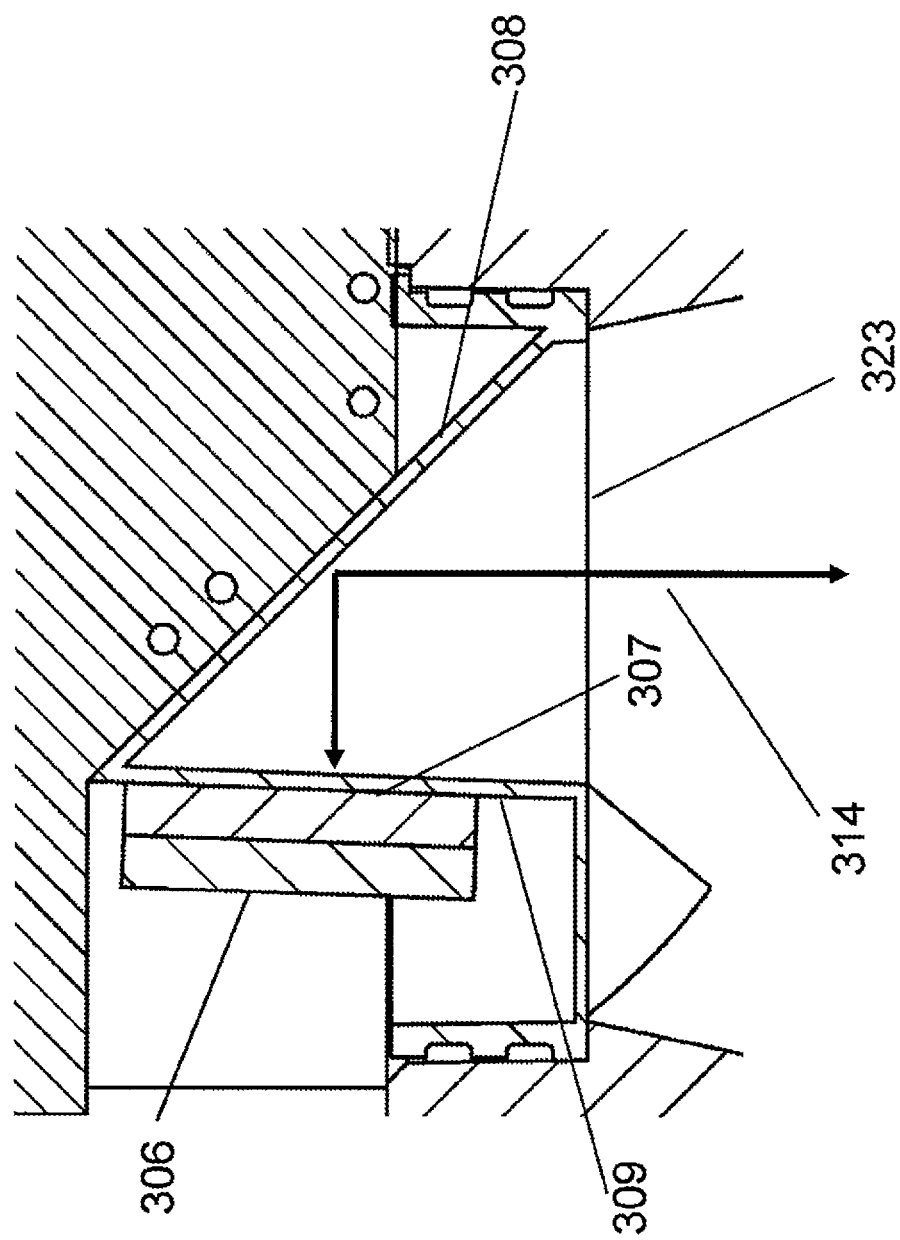
FIG. 3 illustrates a transducer assembly showing the path of the ultrasonic signal, according to some embodiments of the disclosed invention.

FIG. 3 illustrates a transducer assembly including the path of the ultrasonic signal, according to some embodiments of the disclosed invention. The ultrasonic signal is produced by a piezo cell 306, thru a matching block 307 and the transducer face 309. This ultrasonic signal travels to the flat reflector 308 and is reflected down towards the liquid surface through an opening 323, as shown by the signal path 314. The sound wave bounces off the liquid surface and returns along the path 314 to the transducer where it is converted into a voltage by the piezo cell 306. Flat reflector 308 may be formed of different materials that are capable of reflecting an ultrasonic signal, such as a mirror, a flat metallic surface, plastic, ceramic, and the like.

In some embodiments, the entire sensor or transducer assembly may be rotated from the transducer face being vertical (that is to maintain the transducer face at about 90 degrees with respect to the surface of the liquid, which tends to be horizontal) for measuring the height of solid materials such as grain and pellets where the surface of the material being measured is not horizontal, or in the case that the liquid container and the transducer are titled at an angle with respect to the liquid surface. In these cases, the entire sensor structure is normally tilted to ensure that the ultrasonic signal is approaching the material surface at right angles such that the reflection from the surface returns to the transducer surface.

Figure 4:
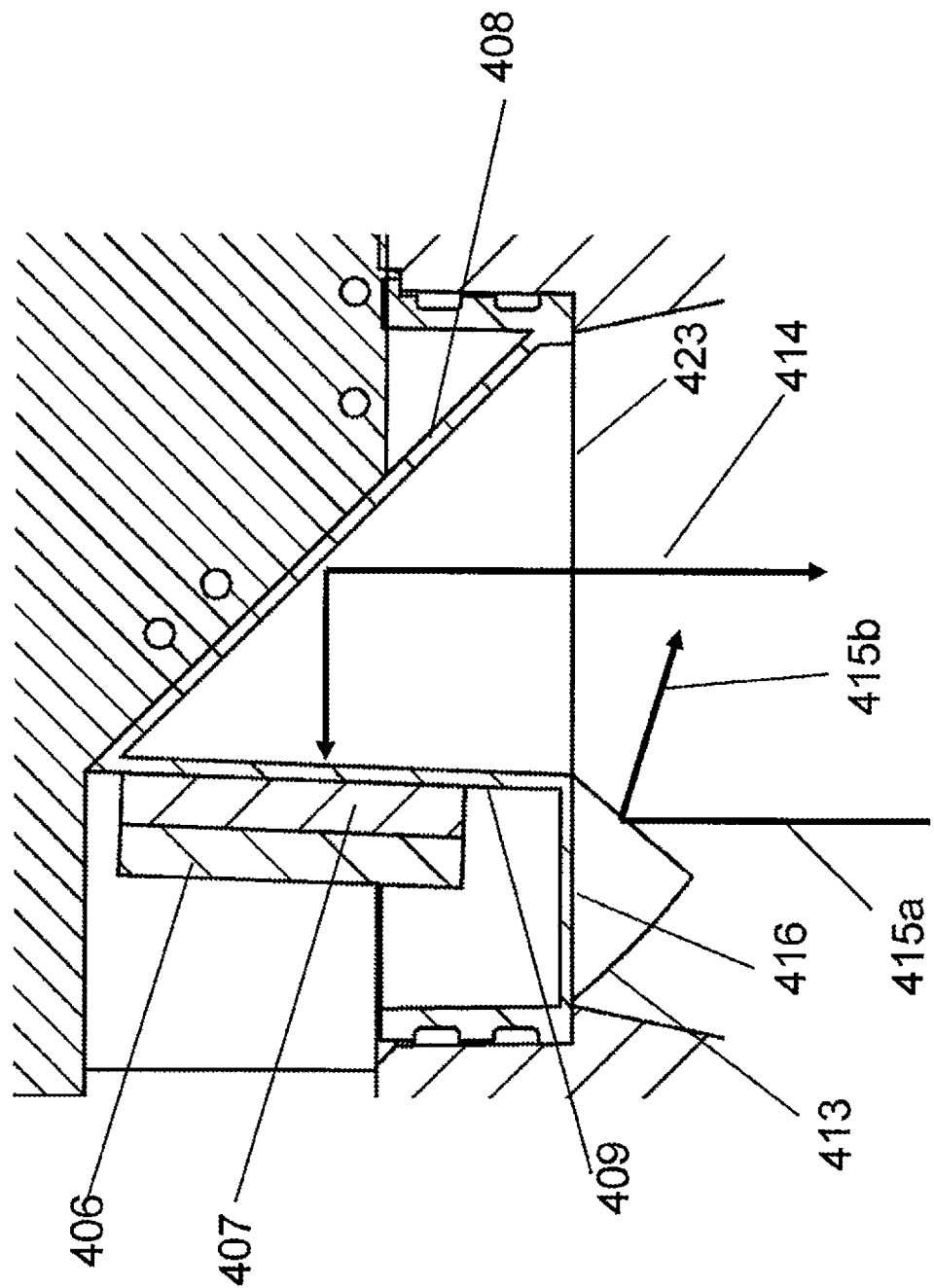
FIG. 4 shows a transducer assembly including a scattering structure, deflecting an unwanted signal away from the liquid surface, according to some embodiments of the disclosed invention.

The surface of the reflector 308 is flat to prevent different parts of the reflected signal from traveling different path lengths. Using a convex or parabolic shaped mirror causes parts of the signal to travel different lengths which can affect the accuracy of measuring the time delay and also may cause signal cancellation where different parts of the signal may be out of phase with other parts and thus cancel the signal. Some benefits may be gained in both size and cost from making the transducer face and the flat reflector and the rest of the transducer housing as an integral unit and from the same material, which can easily be made by injection molding. This way, the extra mounting room needed and extra components to attach and house a separate transducer are eliminated FIG. 4 shows a transducer assembly including a scattering structure, according to some embodiments of the disclosed invention. The ultrasonic signal is produced by a piezo cell 406, thru a matching block 407 and the transducer face 409. This ultrasonic signal travels to the flat reflector 408 and is reflected down towards the liquid surface, as shown by the signal path 414. The sound wave is reflected from the liquid surface and returns along the path 414 to the transducer where it is converted into a voltage by the piezo cell 406. Since the cut away in this figure is in the middle of the reflector, a flat surface 416 is shown between the two scattering structures (shown in FIG. 11). Due to the spreading of the ultrasonic signal and the echo signal, some energy/signals are dissipated toward other parts of the assembly, outside the opening 423. These signals are illustrated by signal 415*a*. In some embodiments, a scattering structure 413 (in this case, a pyramid-shaped) is used to reflect these signals 415*b* in such a direction that they are not directly reflected back to the liquid surface, that is away from the fluid surface. If these signal are reflected directly back to the liquid surface, they may interfere with the determination of the liquid level in a manner described below.

FIG. 4 shows the unintended signal 415*a* being reflected off as signal 415*b* by the scatter surface of the scattering structure 413 so that the unintended or unwanted signals do not complete a second time around path back to the transducer face 409.

Figure 6:
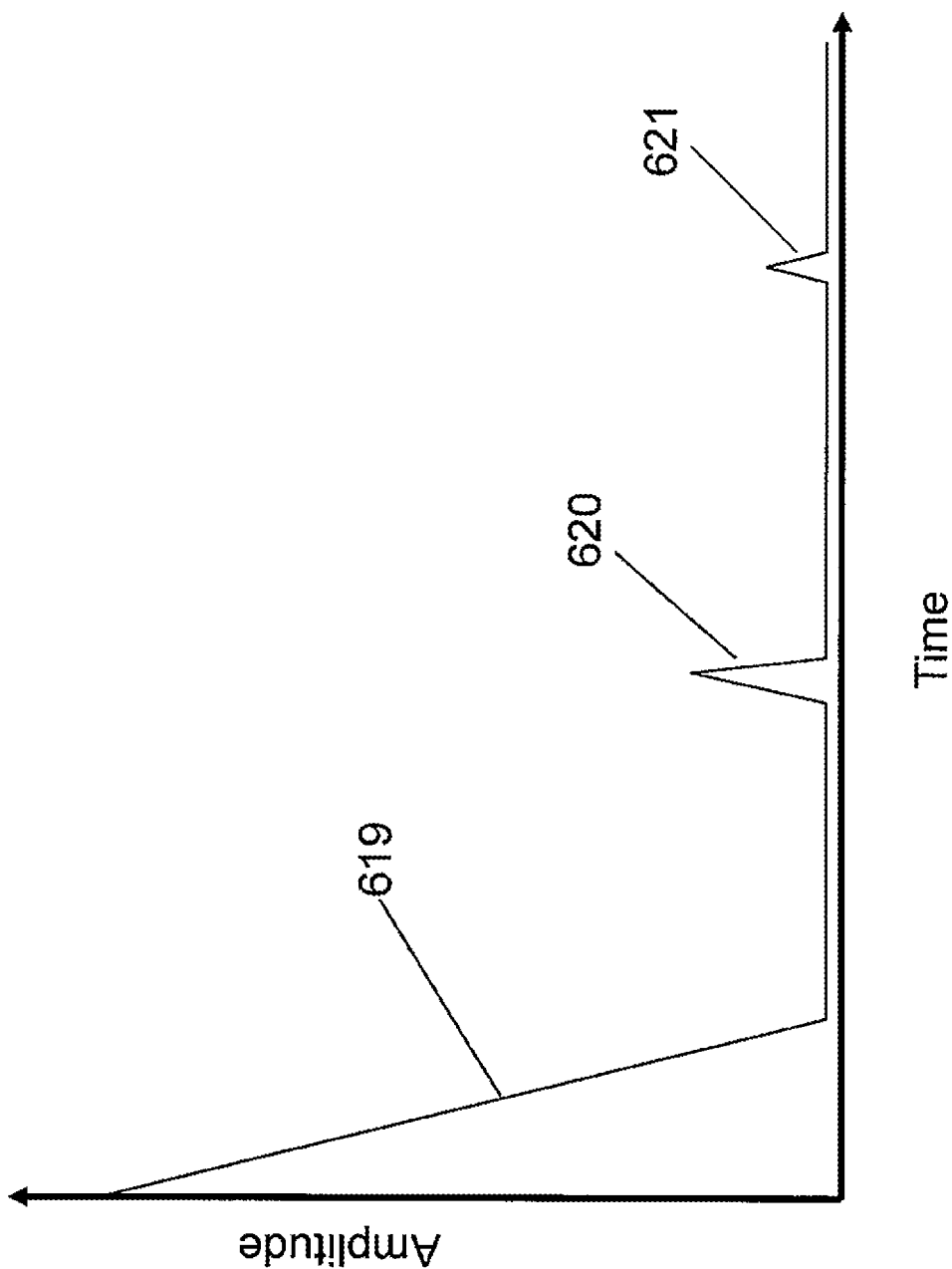
FIG. 6 shows a plot of an ultrasonic echo signal received with scattering structure in place, according to some embodiments of the disclosed invention.

FIG. 6 shows a plot of an ultrasonic echo signal received with a scatter structure in place, according to some embodiments of the disclosed invention. The plot illustrates the echo amplitude versus time for an intended signal path. A transducer ring down 619 depicts the energy in the transducer assembly resulting from the transducer generating the sound pulses. As shown, the energy dies down, as time progresses. This is generally referred to as ring down time and results in a period of time where the echo can not be detected. The position of the intended echo 620 represents the time for the ultrasonic signal to travel from the transducer face to the liquid surface and back to the transducer face. Echo 621 represents the time for the signal to travel twice between the transducer face and the surface. This echo is commonly referred to as the second time around echo and is useful in determining the liquid level in the case that the first echo 620 is covered up by the ring down 619, which may occur as the liquid level rises and approaches the transducer.

Figure 5:
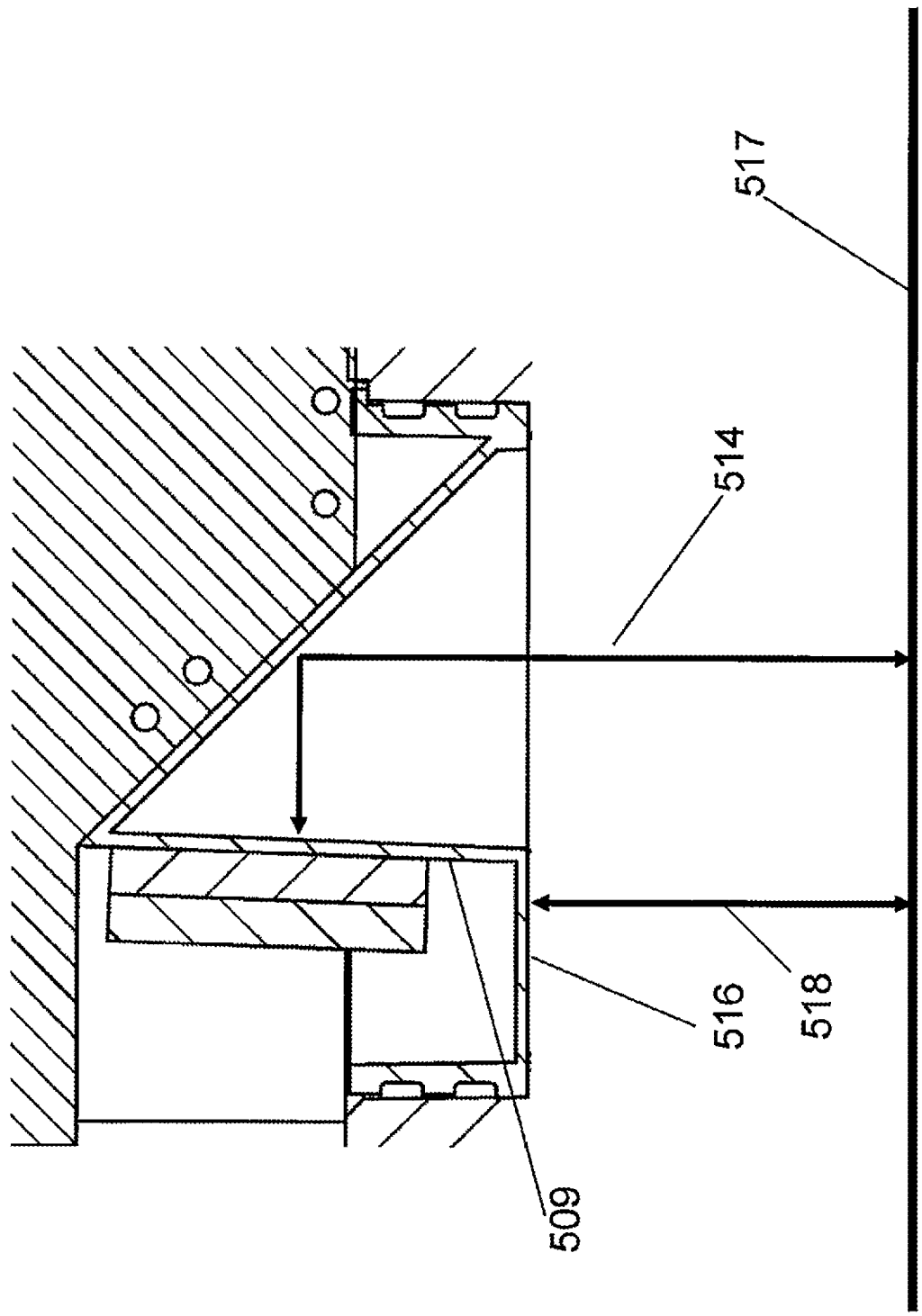
FIG. 5 depicts a transducer assembly showing ultrasonic signal paths without a scattering structure in place, according to some embodiments of the disclosed invention.

FIG. 5 depicts a transducer assembly showing ultrasonic signal paths without a scattering structure assembly in place, according to some embodiments of the disclosed invention. An exemplary unintended signal path that exists without the scattering structure is shown. The path 518 is shown where some of the signal from path 514 due to signal spreading reflects off a flat horizontal surface such as 516. This signal then returns to the transducer via path 514 in such a manner that they will reach the transducer face and produce an echo that is unwanted, as described below with respect to FIG. 7.

Figure 7:
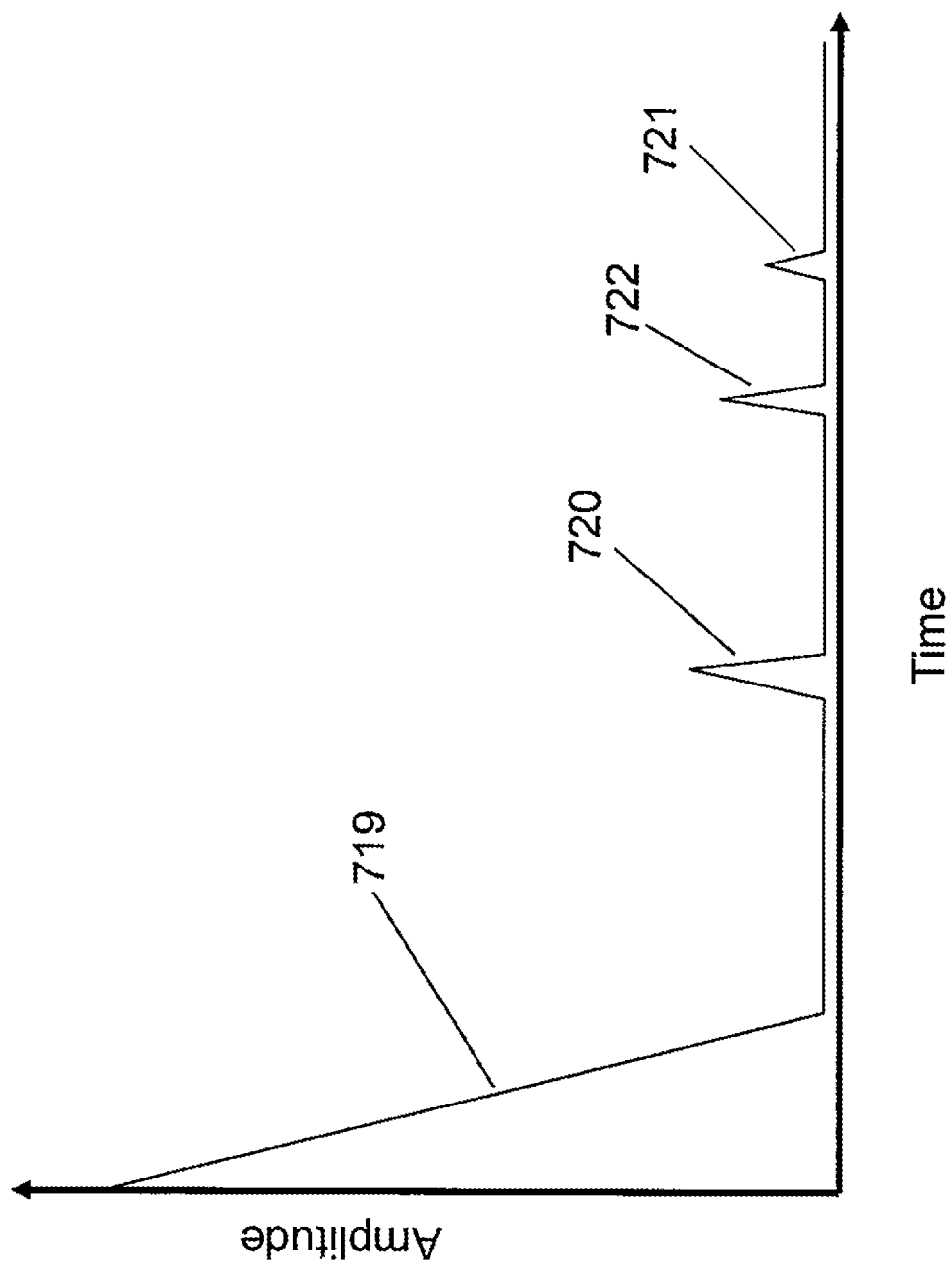
FIG. 7 illustrates a plot of an echo signal received without the scattering structure in place, according to some embodiments of the disclosed invention.

FIG. 7 illustrates a plot of an echo signal received without the scatter structure in place, according to some embodiments of the disclosed invention. That is, the condition when the unintended signal path 518 is not removed by any scatter surface in FIG. 5. As shown in FIG. 7, an extra echo 722 is introduced in front of the second time around 721. If the extra echo 722 is mistaken for the second time around 721, errors are produced in the sensor output. This scenario gets even more complicated when a third time around signal is being used to determine the liquid level because two extra unintended echoes are introduced. The scatter surface becomes increasingly more significant to the performance of the sensor, when the liquid level is high enough to move the first echo 720 into the ring down time 719.

Figure 8:
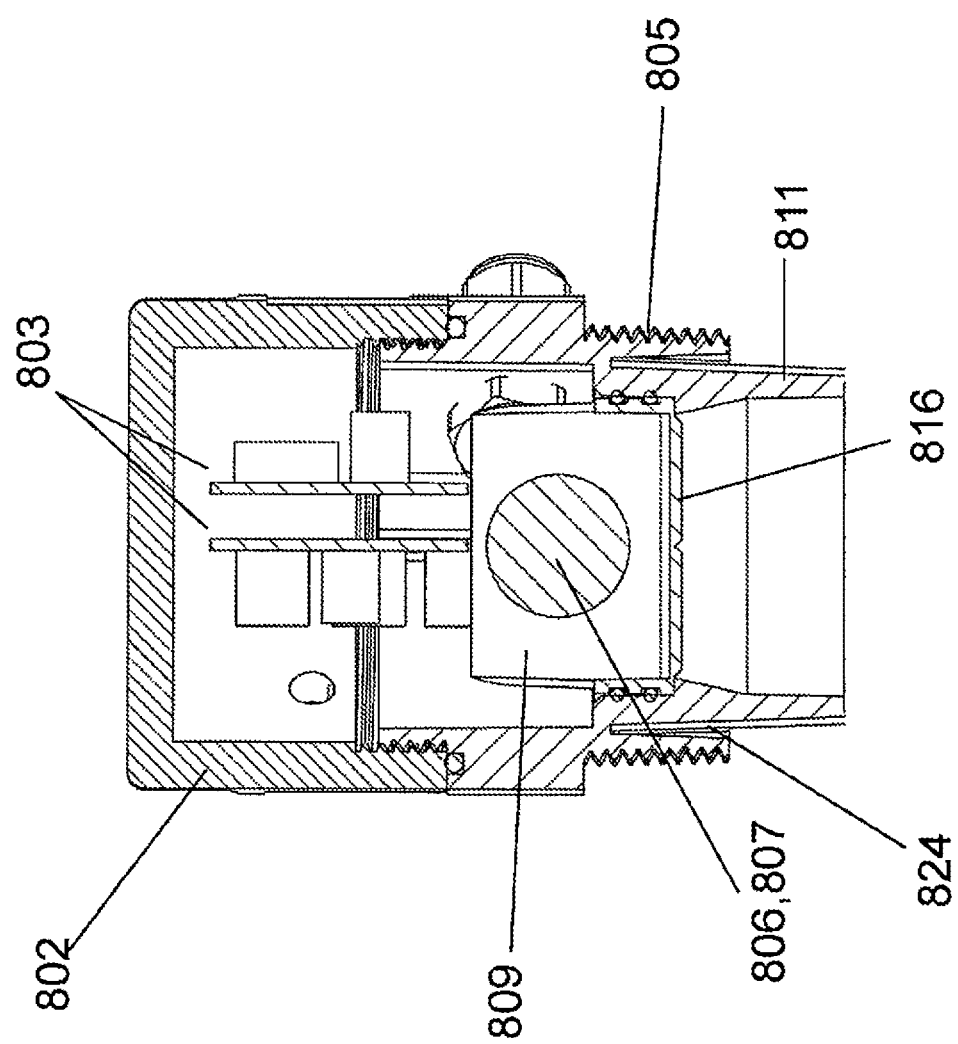
FIG. 8 shows a cut away view of an ultrasonic signal sensor rotated about 90 degrees on the vertical axis, according to some embodiments of the disclosed invention.

FIG. 8 shows a cut away view of an ultrasonic signal sensor rotated about 90 degrees on the vertical axis and a rectangular transducer face 809 facing a piezo cell/matching block 806/807 mounted on an isolation feature, according to some embodiments of the disclosed invention. By mounting the piezo cell 806 and matching block 807 on a non-circular face 809 such as the rectangular face shown, the resonance frequency of the face 809 can be controlled by independently adjusting the dimensions of the rectangle. By moving the resonance frequency of the transducer face away from the operating frequency of the piezo cell, the transducer face is less likely to be excited into resonance, which could adversely affect the ring down time. Dampening material such as cork can be added to the surface outside of the circular attachment points of the matching block to dampen the vibrations that may be produced.

In some embodiments, a dampening material (for example, 1240 in FIG. 12C), such as a cork or similar materials, can be added to the transducer face 809 around the piezo cell 806 and matching block 807 to dampen any vibrations in the face material without affecting the level of echoes received by the transducer yet reducing the ring down time. The dampening material may be placed on all of the transducer face surrounding the matching block completely and covering the transducer face. Additional dampening material may be placed on the back side and outside of the piezo cell to reduce the ring time created by the resonance frequency of the piezo cell (transducer) itself. In some embodiments, the piezo cell 806 and matching block 807 are mounted to a circular face of similar diameter to the cell. It has been found that the resonant frequency of such a circular face may be too near that of the piezo cell 806 and thus contributes to the ring down time. Surface 816 is the surface that is coming out of the page and is where the scattering features are mounted. The face 809 does not need to be rectangular, but of a shape that the resonant frequency can be controlled and dampening material applied. Here, two printed circuit boards 803 are shown within a cover 802.

In some embodiments, an energy decoupling mechanism 824 includes a gap between the sound tube 811 and threads 805 to reduce coupling of the energy produced during transmission from the sensor mounting surface and thus reducing false echoes from the liquid tank structure.

Figure 9:
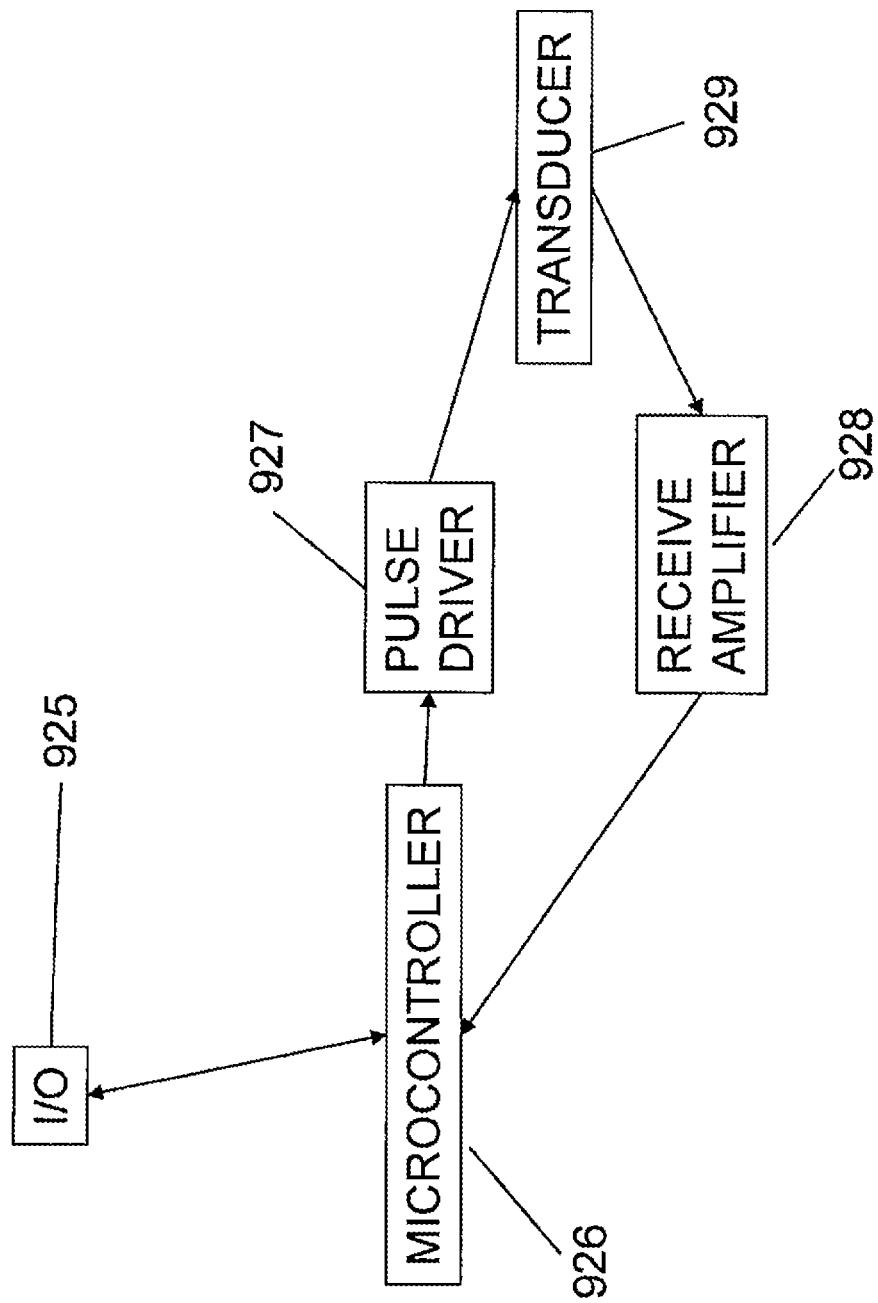
FIG. 9 is an exemplary electrical functional block diagram of an ultrasonic signal sensor, according to some embodiments of the disclosed invention.

FIG. 9 is an exemplary electrical functional block diagram of an ultrasonic level sensor, according to some embodiments of the disclosed invention. As shown, a microcontroller 926 (or a microprocessor with associated memory and input/output circuitry) creates the signals that control a pulse driver 927. The pulse driver 927 converts the signals from the microcontroller into the high voltage signals needed to drive transducer 929. The transducer 929 produces ultrasonic signal that is transmitted to the liquid surface. The transducer 929 acts like a microphone and receives the echo signal and feeds a receiver amplifier 928. The receiver amplifier amplifies the weak echo signal and feeds the signal to the microcontroller 926. The microcontroller processes the signal and determines the level of the liquid, using a variety of known techniques. The microcontroller 926 then controls an I/O circuit 925 to communicate the liquid level wirelessly, wired or both. The I/O circuit 925 is also capable of receiving commands from an external computer for initializing, calibrating, setting or changing parameters and the like, for the transducer.

Transducer 929 needs to be efficient in transmitting and receiving the signal to be able to detect the echo signals at a maximum range of the sensor. Efficiency of the transducer is affected by all of the materials between the piezo cell and the air interface at the surface of the transducer face. This includes a matching block, the thickness of the transducer face and the adhesive or coupling material(s) in the joints that bond these components together. Manufacturing tolerances cause sufficient variation in the total thickness of the stack of materials so that the efficiency of the transducer is significantly affected. Typically, the thickness of the transducer face would be trimmed to account for these variations. In some embodiments, the frequency of the transmitter pulse is adjusted since the transducer face cannot be easily trimmed, because of the mirror structure as discussed above. The frequency of the transmitted pulse is adjusted for each sensor at the time the unit is calibrated in production.

In various embodiments, depicted in FIGS. 1-5 and 8-9, and various combinations thereof, the ultrasonic level sensor may further include one or more of a scattering structure to reflect unwanted scattered ultrasonic signals away from the surface of the material, a seal for the sound tube to prevent the liquid from reaching the transducer face, a mounting means for attaching the ultrasonic level sensor to the container, a wired or wireless transmitter for transmitting the indication of the level of the material in the container, a dampening material placed on the transducer face to dampen any vibrations in the transducer face, another dampening material placed on a back side of the ultrasonic transducer to reduce a ring time created by a resonance frequency of the ultrasonic transducer, and/or a plurality of ribs placed on a back surface of the reflector to stiffen the reflector and prevent vibration of the reflector flat surface.

Figure 10:
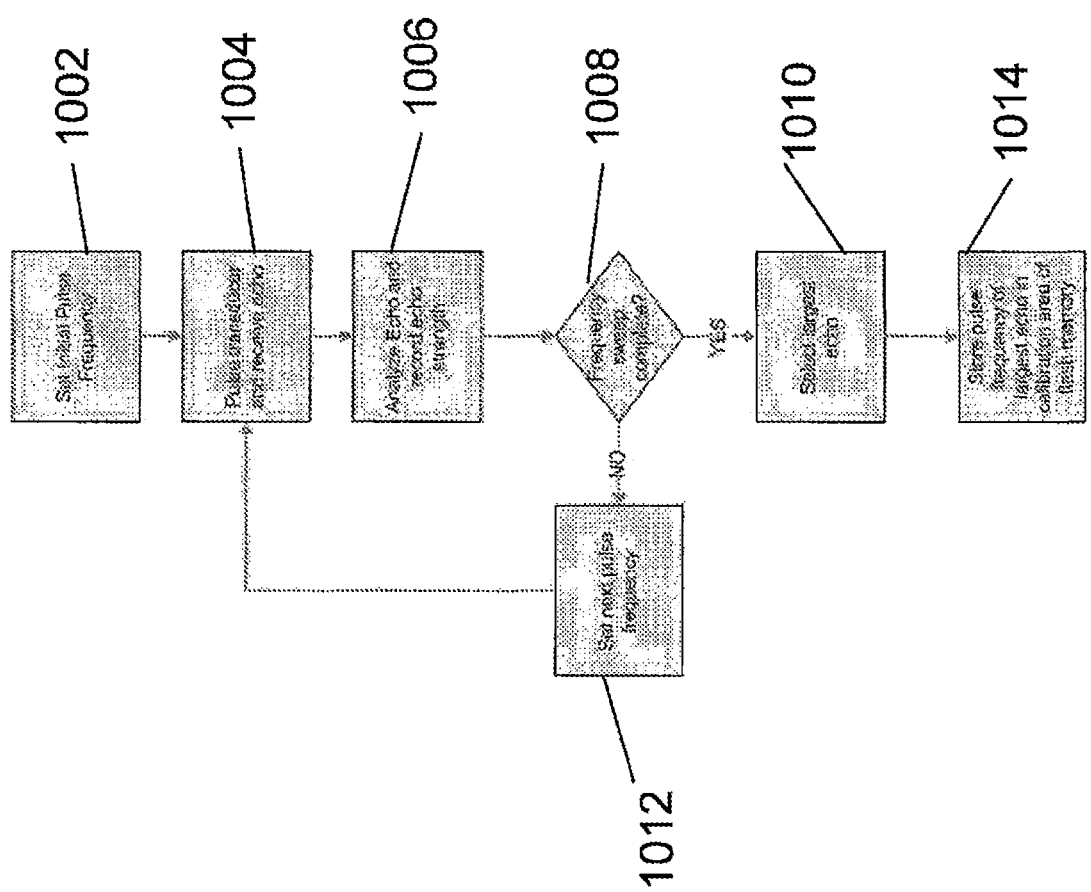
FIG. 10 illustrates an exemplary process flow for adjusting the pulse frequency of a transducer, according to some embodiments of the disclosed invention.

FIG. 10 illustrates an exemplary process flow for adjusting the pulse frequency of an ultrasonic transducer, according to some embodiments of the disclosed invention. As shown, in block 1002, a frequency at the edge of the frequency tune region of the transducer is selected. The frequency tune region and its edges/boundaries are determined by analysis of the process variations and their affect on the transducer operating frequency. Glue joints may vary by several thousands of an inch, the matching block may vary by the same amount and the thickness of the injected molded part may vary several thousandths of an inch. This may move the peak frequency several kHz from center. The ultrasonic sensor is operated against a known (test) reflector set up at the test station. This reflector could be, for example a flat board at a fixed position from the transducer and a pulses are transmitted and received in the same way that a liquid surface would be measured, in block 1004. A pulse with the selected frequency is sent out, the echo received and a processor (microcontroller) determines the strength (e.g., amplitude) of the echo signal reflected from the test reflector. The amplitude of the echo signal is stored, in block 1004. The process is repeated with the transmit pulse frequency being incrementally adjusted/varied (block 1012) between each cycle until the entire tune region is covered and the frequency sweep is completed (block 1008). The largest echo (for example, highest amplitude from the values stored in a memory in block 1004) is determined and selected in block 1010 and the frequency that was used to produce that echo is stored in a sensor calibration table in block 1014 for future use as the operating frequency of the transducer.

FIGS. 12A, 12B and 12C show a mounting method for an ultrasonic transducer where the transducer housing is welded 1238 to a tubular housing 1237. FIG. 12A is a top view, FIG. 12B is a front view and FIG. 12C shows a sectional view of the ultrasonic transducer. As shown, an optional dampening material 1240 is placed around a piezo cell 1206 and a matching block 1207 on the transducer face 1209. Ribs 1239 are placed on the back surface of a reflector 1208 to stiffen the reflector to prevent vibration of the reflector surface to reduce ring down time and to reduce signal losses from the reflector surface vibrating out of phase with the signals.

Figure 13A:
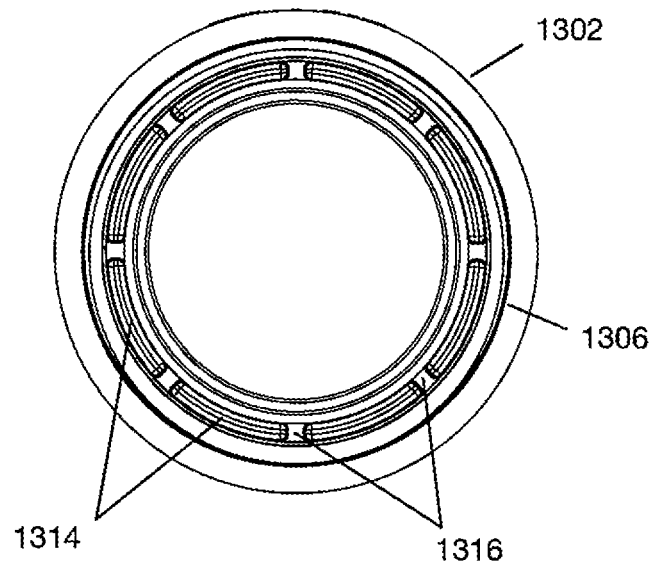
FIG. 13A shows a bottom view and FIG. 13B shows a section view of a liquid trap for an ultrasonic transducer, according to some embodiments of the disclosed invention.
Figure 13B:
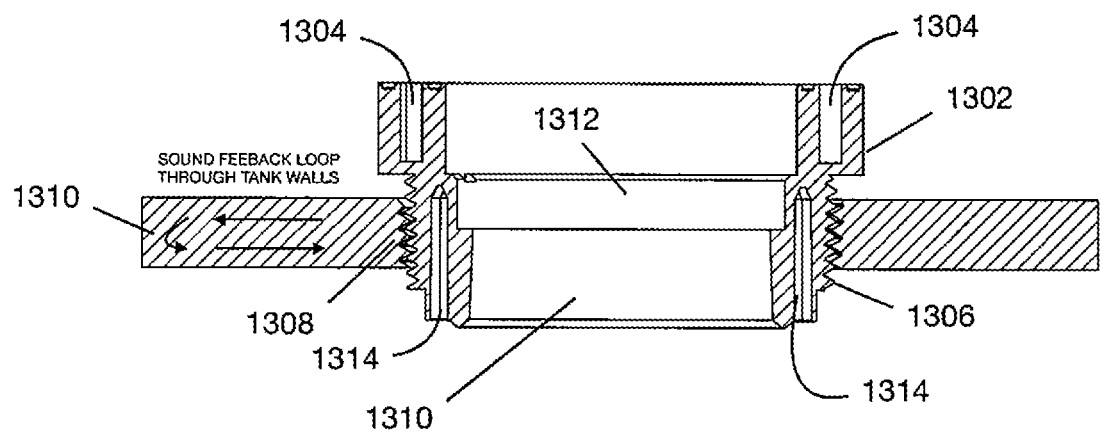

FIGS. 13A and 13B show a liquid trap for an ultrasonic transducer, according to some embodiments of the disclosed invention. In some embodiments, the disclosed invention includes an optional sealed liquid trap that prevents the liquid from reaching the transducer face and thus improving the ability to detect the correct liquid level when the liquid level is at or above the bottom edge of mounting structure 1302. As depicted, a liquid trap 1310 prevents splashing liquids from reaching the transducer face (e.g., 208 in FIG. 2) and prevents the liquid from reaching the transducer face in the case of the overfilling the container. That is, since the transducer housing and the sound tube are air tight, when liquid rises up above the opening of these structures, air is trapped in the cavity that is formed by the structure. The pressure caused by air trapped in the cavity thus protects the face of the transducer from getting contaminated by the liquid. FIG. 13A shows a bottom view and FIG. 13B shows a section view of the mounting structure 1302 of the reflective ultrasonic transducer installed into a threaded female socket 1308 of a tank.

While the vast majority of the energy is translated axially from the transducer assembly (and reflected by the flat reflector surface into the tank), there is some ratio of energy that is translated radially, and therefore into mounting structure 1302. In the embodiments shown in FIG. 13B, the transducer assembly is positioned and sealed in transducer mounting section 1312 of the mounting structure 1302. When mounting structure 1302 is installed in threaded female sockets 1308 of common process tanks, that radial energy is reflected by the stiff tank walls 1310 and fed back into the transducer's receive channel. This can cause unwanted signal noise and false readings, especially as the liquid level in the tank gets closer to the transducer face. The sound traps 1314 serve to decouple the transducer from the tank walls so that resonances from one do not affect the other and to isolate unwanted vibrations of the container from the transducer. In these embodiments, the sound traps 1314 are depicted as eight hollow cavities between the inner tube 1310 of the mounting structure and the process threads 1306. Ribs 1316 provide structural strength to process threads 1306 so that there is no deformation or deflection of the mounting structure 1302 when it is installed. Screw holes 1304 allow for a housing and electronic assembly to be added to the structure.

FIGS. 14A, 14B and 14C depict bottom, isometric and side views of a transducer housing including a scattering device having a wedge-shaped scatter surface, according to some embodiments of the disclosed invention. As shown, scattering device 1402 includes a wedge-shaped scatter surface (reflectors) that scatters the ultrasonic sound signals. The transducer face 1408, flat reflector 1406, and an opening 1410 for the ultrasonic sound to travel are also shown. Transducer mounting surface and groves 1404 for O-rings help seal attachment points to the housing. Due to the spreading of the ultrasonic signal and the echo signal, some energy/signals are dissipated toward other parts of the assembly, outside the opening.

FIGS. 15A, 15B and 15C illustrate a bottom, isometric and side view of a transducer housing including a scattering device having a wedge-shaped scatter surface, according to some embodiments of the disclosed invention. As shown, scattering device 1502 includes multiple parallel wedge-shaped scatter surfaces (reflectors) that scatter the ultrasonic sound signals. The transducer face 1508, flat reflector 1506, and an opening 1510 for the ultrasonic sound to travel are also shown. Transducer mounting surface and groves 1504 for O-rings help seal attachment points to the housing.

FIGS. 16A, 16B and 16C show a bottom, isometric and side view of a transducer housing including a scattering device having a cone/dome-shaped scatter surface, according to some embodiments of the disclosed invention. As shown, scattering devices/structures 1601 and 1602 include a dome-shaped scatter surface (reflectors) that scatter the ultrasonic sound signals. The transducer face 1606, flat reflector 1608, and an opening 1610 for the ultrasonic sound to travel are also shown. Transducer mounting surface and groves 1604 for O-rings help seal attachment points to the housing. Due to the spreading of the ultrasonic signal and the echo signal, some energy/signals are dissipated toward other parts of the assembly, outside the opening.

FIGS. 17A, 17B and 17C depict a bottom, isometric and side view of a transducer housing including a scattering device having a cone/dome-shaped scatter surface, according to some embodiments of the disclosed invention. As depicted, scattering devices/structures 1701 and 1702 include a cone-shaped scatter surface (reflectors) that scatter the ultrasonic sound signals. The transducer face 1708, flat reflector 1706, and an opening 1710 for the ultrasonic sound to travel are also shown. Transducer mounting surface and groves 1704 for O-rings help seal attachment points to the housing. Due to the spreading of the ultrasonic signal and the echo signal, some energy/signals are dissipated toward other parts of the assembly, outside the opening.

FIGS. 18A, 18B and 18C show a bottom, isometric and side view of a transducer housing including a scattering device having multiple dome-shaped scatter surfaces, according to some embodiments of the disclosed invention. As shown, a plurality of scattering devices/structures 1802 include a dome-shaped scatter surface (reflectors) that scatter the ultrasonic sound signals. The transducer face 1806, and an opening 1808 for the ultrasonic sound to travel are also shown. Transducer mounting surface and groves 1804 for O-rings help seal attachment points to the housing. Due to the spreading of the ultrasonic signal and the echo signal, some energy/signals are dissipated toward other parts of the assembly, outside the opening.

FIGS. 19A, 19B and 19C show an isometric view of a transducer housing including a scattering device having multiple cone-shaped scatter surfaces, according to some embodiments of the disclosed invention. As depicted, a plurality of scattering devices/structures 1902 include cone-shaped scatter surfaces (reflectors) that scatter the ultrasonic sound signals. The transducer face 1906 and an opening 1908 for the ultrasonic sound to travel are also shown. Transducer mounting surface and groves 1904 for O-rings help seal attachment points to the housing. Due to the spreading of the ultrasonic signal and the echo signal, some energy/signals are dissipated toward other parts of the assembly, outside the opening.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as depicted by the appended claims and drawings

The invention claimed is:

1. An ultrasonic level sensor comprising:
   a housing;
   an ultrasonic transducer having a face surface for emitting an ultrasonic signal;
   a reflector with a flat surface positioned at an angle with respect to the face surface of the ultrasonic transducer for reflecting and directing the ultrasonic signal to a surface of a material in a container, wherein the ultrasonic signal is reflected from the surface of the material and from the flat surface of the reflector and received by the ultrasonic transducer;
   one or more scattering structures to reflect away unwanted scattered ultrasonic signals reflected from the surface of the material from being directed back to the surface of the material, wherein the one or more scattering structure have a wedge-shaped scatter surface or a cone/dome-shaped scatter surface; and
   a controller for measuring a time period between emission of the ultrasonic signal and receipt of the reflected ultrasonic signal by the transducer to determine an indication of the level of the material in the container.

2. The ultrasonic level sensor of claim 1, further comprising a sound trap to decouple the transducer from the walls of the container.

3. The ultrasonic level sensor of claim 1, wherein the material is a liquid, and wherein the transducer face is positioned vertically with respect to a horizontal level of the liquid.

4. The ultrasonic level sensor of claim 1, further comprising a wired or wireless transmitter device for transmitting the indication of the level of the material in the container.

5. The ultrasonic level sensor of claim 1, wherein the reflector with a flat surface is a mirror, a flat metallic surface, a flat plastic surface or a flat ceramic surface.

6. The ultrasonic level sensor of claim 1, wherein the transducer face, the reflector, and the scattering structure are integrally formed in a same containing material.

7. The ultrasonic level sensor of claim 1, further comprising a dampening material placed on the transducer face to dampen any vibrations in the transducer face.

8. The ultrasonic level sensor of claim 1, further comprising a dampening material placed on one or more of a back side and an outside of the ultrasonic transducer to reduce a ring time created by a resonance frequency of the ultrasonic transducer.

9. The ultrasonic level sensor of claim 1, further comprising a plurality of ribs placed on a back surface of the reflector to stiffen the reflector and prevent vibration of the flat surface of the reflector.

10. The ultrasonic level sensor of claim 1, wherein the material is a liquid, and further comprising a sound tube protruding away from the housing and a seal for the sound tube to prevent the liquid from reaching the transducer face.

11. The ultrasonic level sensor of claim 10, wherein the transducer face, the reflector, and the sound tube are rotatable with respect to the surface of the material.

12. An ultrasonic level sensor comprising:
   a housing including mounting means for placement in a container containing a liquid, wherein the container includes a plurality of walls;
   an ultrasonic transducer having a face surface for emitting an ultrasonic signal, wherein the face surface is at a vertical angle with respect to a surface of the liquid in the container;
   a flat mirror positioned at an angle with respect to the face surface of the ultrasonic transducer for reflecting and directing the ultrasonic signal to the surface of the liquid, wherein the ultrasonic signal is reflected from the surface of the liquid and from the flat surface of the mirror and received by the ultrasonic transducer; and
   a plurality of sound traps within the housing to decouple the transducer from the walls of the container to isolate unwanted vibrations of the container from the ultrasonic transducer.

13. The ultrasonic level sensor of claim 12, further comprising a controller for measuring a time period between emission of the ultrasonic signal and receipt of the reflected ultrasonic signal by the transducer to determine an indication of the level of the liquid in the container.

14. The ultrasonic level sensor of claim 12, further comprising one or more scattering structures to reflect unwanted scattered ultrasonic signals away from the surface of the material, wherein the one or more scattering structure have pyramid-shaped scatter surface, wedge-shaped scatter surface or cone/dome-shaped scatter surface.

15. The ultrasonic level sensor of claim 12, further comprising a wired or wireless transmitter device for transmitting the indication of the level of the material in the container.

16. The ultrasonic level sensor of claim 12, wherein the transducer face, the reflector, and the scatter structure are integrally formed in a same plastic material.

17. The ultrasonic level sensor of claim 12, wherein the transducer face and the reflector are rotatable with respect to the surface of the liquid.

* * * * *